US008123162B2

(12) United States Patent
Sirkis

(10) Patent No.: US 8,123,162 B2
(45) Date of Patent: Feb. 28, 2012

(54) UNMANNED AIR VEHICLES AND METHOD OF LANDING SAME

(75) Inventor: Omri Sirkis, Ramat Gan (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 11/098,529

(22) Filed: Apr. 5, 2005

(65) Prior Publication Data

US 2006/0006281 A1  Jan. 12, 2006

(30) Foreign Application Priority Data

Jul. 8, 2004  (IL) .......................................... 162915

(51) Int. Cl.
*B64C 25/56* (2006.01)
*B64C 39/02* (2006.01)
(52) U.S. Cl. .................................... 244/100 A; 244/139
(58) Field of Classification Search .............. 244/100 A, 244/105, 107, 139
See application file for complete search history.

(56) References Cited

U.S. PATENT DOCUMENTS

| | | | |
|---|---|---|---|
| 3,738,597 A * | 6/1973 | Earl et al. ................... | 244/100 A |
| 4,205,811 A * | 6/1980 | Palm et al. ................. | 244/100 A |
| 4,261,533 A * | 4/1981 | Roberts et al. .............. | 244/7 R |
| 4,298,177 A * | 11/1981 | Berlongieri .................. | 244/139 |
| 4,697,762 A * | 10/1987 | Arney ........................... | 244/101 |
| 4,923,145 A * | 5/1990 | Broadhurst ................. | 244/100 A |
| 5,035,382 A * | 7/1991 | Lissaman et al. ............ | 244/190 |
| 5,259,574 A | 11/1993 | Carrot | |
| 5,560,568 A * | 10/1996 | Schmittle ...................... | 244/48 |
| 5,944,282 A * | 8/1999 | Clausnitzer et al. ...... | 244/100 A |
| 6,056,237 A * | 5/2000 | Woodland ..................... | 244/3.15 |
| 6,158,691 A * | 12/2000 | Menne et al. ............... | 244/100 A |
| 2004/0262894 A1* | 12/2004 | Kempf ......................... | 280/730.1 |

FOREIGN PATENT DOCUMENTS

DE   10222712   12/2003

OTHER PUBLICATIONS

Crowther, W.J., Perched Landing and Takeoff for Fixed Wing UAVs, Symposium on Unmanned Vehicles for Aerial, Ground and Naval Military Operations, 2000, Ankara, Turkey.
Turner et al., "Air Bag Impact Attenuation System for the AQM-34V Remote Piloted Vehicle", Journal of Aircraft, American Institute of Aeronautics & Astronautics, New York, US; vol. 19, No. 11, Nov. 1982; pp. 984-989, XP002065728; ISSN: 0021-8669.
International Search Report issued on Jul. 10, 2005 for PCT/IL2005/000714.
European Office Action issued on Mar. 9, 2010 for 05759026.7.
Reply to European Office Action issued on Mar. 9, 2010 for 05759026.7, filed on Nov. 3, 2011.

* cited by examiner

*Primary Examiner* — Joshua J Michener
*Assistant Examiner* — Joseph W Sanderson
(74) *Attorney, Agent, or Firm* — The Law Office of Michael E. Kondoudis

(57) ABSTRACT

There is provided an Unmanned Air Vehicle (UAV) including an engine and an airframe, including means for performing a deep stall maneuver at least one inflatable sleeve connected or connectable to the airframe, and means for inflating the sleeve during flight, wherein the inflated sleeve extends along the lower side of the airframe so as to protect same during deep stall landing. A method for operating an Unmanned Air Vehicle (UAV), including an engine and an airframe is also provided.

5 Claims, 1 Drawing Sheet

UNMANNED AIR VEHICLES AND METHOD OF LANDING SAME

FIELD OF THE INVENTION

The present invention relates to unmanned air vehicles and more particularly to the structure of an unmanned air vehicle and a method of landing it.

BACKGROUND OF THE INVENTION

While launching such Unmanned Air Vehicles (UAV) is carried out in conventional manners either by means of a runway on which the UAV is propelled to gain sufficient launching speed, or is launched from a base or a short elevated runway or even from an operator's hand, the landing thereof is more problematic and requires greater sophistication and unique techniques.

There are known in the art several methods of landing UAVs. The classic landing is on the vehicle's wheels along a runway. Similar landings are effected with vehicles equipped with skids, sledges or even with reinforced airframes, all necessitating runways or flat clear stretches of land. The per-se known deep stall technique can be applied to any of the above aircraft landing concepts/techniques and equipment, in a manner similar to that used when landing on the aircraft skids, sledges or airframes.

Utilizing the deep stall landing technique is, however, problematic in that the UAV is subject to severe jolts and accelerations on impact with the ground, often causing damage to the vehicle's structure and its rather sensitive payload, thus severely limiting the number of times that a single vehicle can safely be reused without repair. Furthermore, even with the deep stall technique, the landing terrain must always be carefully chosen, since rough terrains are unsuitable for this purpose.

DISCLOSURE OF THE INVENTION

It is therefore a broad object of the present invention to ameliorate the disadvantages of the deep stall landing techniques of UAVs and to provide a more reliable protection to the vehicle's payload and integrity.

It is a further object of the present invention to provide a UAV structure facilitating a reduced strike impact during deep stall landing.

It is still a further object of the invention to provide a UAV capable of deep stall landing also on rough terrains.

In accordance with the invention, there is therefore provided an Unmanned Air Vehicle (UAV) including an engine and an airframe, comprising means for performing a deep stall maneouvre; at least one inflatable sleeve connected or connectable to said airframe, and means for inflating said sleeve during flight, wherein the inflated sleeve extends along the lower side of said airframe so as to protect same during deep stall landing.

The invention further provides a method for operating an Unmanned Air Vehicle (UAV), including an engine and an airframe, comprising providing means for performing a deep stall maneouvre; at least one inflatable sleeve connected or connectable to the airframe, said sleeve extending along at least a portion of said airframe and means for inflating said sleeve during flight, and performing a deep stall landing of the UAV on said sleeve and inflating said sleeve.

The invention still further provides an airframe for an Unmanned Air Vehicle (UAV), comprising an airframe body; at least one inflatable sleeve; means for connecting the sleeve to said airframe, and means for inflating the sleeve during flight of the UAV.

The term UAV and airframe should be understood as including a flying wing type UAV in which there is no conventional tail and the fuselage may be integrated into the wing structure. The term airframe denotes any structural member of the UAV, such as fuselage, wing, tail assembly, etc.

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is an isometric view, to a reduced scale, of a UAV according to the present invention during landing, and FIG. 2 is an isometric view of a sleeve and a UAV airframe according to the present invention;

DETAILED DESCRIPTION OF PREFERRED EMBODIMENTS

Figure 1:
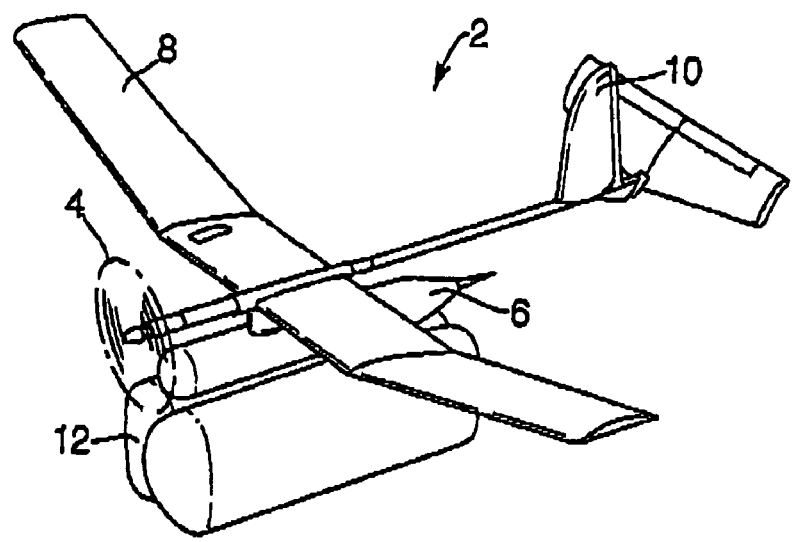
Figure 2:
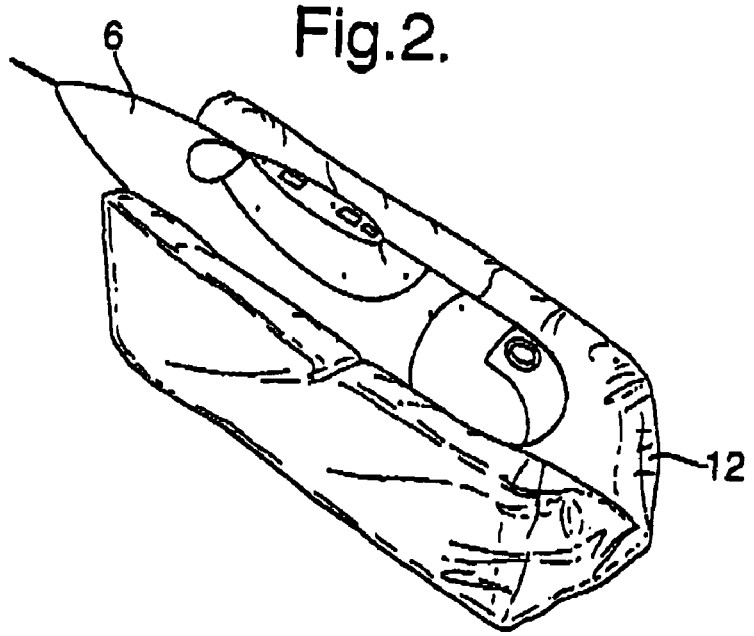

There is illustrated in FIGS. 1 and 2 a UAV 2 having an engine 4, an airframe 6, wings 8 and a tail assembly 10. The above-described UAV parts may be at least partly integral or assembled in-situ. The engine may be an electric or fuel-operated engine. Further seen is a sleeve 12, advantageously made of durable fabric, attached to the airframe 6. The sleeve 12 may take any desired configuration, e.g., may be substantially prismatic, cylindrical, or as shown, composed of two elongated portions wider than the width of the airframe 6, and advantageously, projecting from the front end of the airframe, when inflated. The sleeve 12 may be integrally connected to the lower surface of the airframe 6, or, alternatively, may be coupled thereto by connecting means provided on both the sleeve and the airframe. In a modification, the sleeve 12 may be provided with means, such as straps and/or hooks, which can be utilized before take-off when preparing the UAV for flight.

There is further provided means for inflating the sleeve during flight. Such means may be realized by, per-se known inflating devices such as electrically operated fluid pumps, blowers, electric fans, pressurized fluid containers or explosive charges equipped with remotely activating devices. Inflating the sleeve can be accomplished by utilizing ram air effect during flight and/or descent, thus not requiring an energy consuming source on board of the UAV to provide the pressurized air required to inflate the sleeve. The ram air pressure may be created by the converging air intake according to the well-known design characteristics of a ram-jet engine. A controllable valve is actuated to let the air flow into the sleeve.

The UAV is further provided with means, including a remotely operable servo-mechanism for effecting a deep stall maneouvre. Upon actuation of the servo-mechanism, the level control ailerons are made to assume a low or negative angle-of-attack, introducing an abrupt moment resulting in the nose or front end, and, in fact, of the entire air vehicle, to assume an upward direction. The angle-of-attack of the vehicle wings is likewise abruptly changed. Due to the predetermined relationship between the size of the level control ailerons and the wings, the air vehicle performs a deep stall maneouvre.

The operation of UAV is as follows:

Once the airframe 6 is equipped with the inflatable sleeve 12 and means for inflating it during flight, the UAV is operated in common modes.

Upon preparing the UAV for landing, a deep stall landing maneouvre is performed and the sleeve 12 is then inflated during flight, resulting in an abrupt landing while protecting the vehicle and payload from damage during impact with the ground. The sleeve 12 in its deflated state, stored in the airframe 6 is first being released through an openable hatch, door or doors from the airframe, while inflating it by any of the above-described means. The sleeve 12 may be inflated to a desired degree in consideration with the vehicle's weight, the weight of the payload, the type of terrain in which the vehicle is to be landed, etc. Upon landing, the inflated sleeve 12 first hits the ground, attenuating the impact. The sleeve 12 may then be deflated, checked for possible damage and rearranged on the same or another airframe for the next flight. Also the level control ailerons are rotated back to their normal flight disposition. Since the usage of such a sleeve 12 with a UAV facilitates landing by deep stall even on rough terrains, without or with minimal damage to the vehicle and/or the vehicle's payload, the vehicle may be ready for its further mission within a very short period of time.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An unmanned aerial vehicle (UAV), comprising:
an airframe having a longitudinal axis and a payload located at a front end thereof, the front end being a forwardmost end of the airframe relative to a forward direction of flight;
a deep stall maneuver inducing section that causes the UAV to perform a deep stall maneuver as part of a landing process in which the UAV lands with about zero forward velocity; and
an inflatable sleeve that is inflated after the deep stall maneuver is effected and, when inflated, is disposed and configured so as to contact a landing surface before the airframe,
wherein the sleeve, when inflated,
extends about the longitudinal axis of the airframe,
protrudes beyond the front end of the airframe and essentially in the forward direction, and
protrudes sufficiently far from the front end of the airframe so that the sleeve prevents the airframe from contacting the landing surface when the UAV lands.

2. An unmanned aerial vehicle (UAV), comprising:
an airframe having a longitudinal axis and a payload located at a front end thereof, the front end being a forwardmost end of the airframe relative to a forward direction of flight;
means for causing the UAV to execute a deep stall maneuver as part of a landing process in which the UAV lands with about zero forward velocity; and
an inflatable sleeve that is inflated after the deep stall maneuver is effected and, when inflated, is disposed and configured so as to contact the landing surface before the airframe,
wherein the sleeve, when inflated,
extends about the longitudinal axis of the airframe,
protrudes beyond the front end of the airframe and essentially in the forward direction, and
protrudes sufficiently far from the front end of the airframe so that the sleeve prevents the airframe from contacting the landing surface when the UAV lands.

3. An unmanned aerial vehicle (UAV), comprising:
a wing, a tail section at a rear end of the UAV relative to a direction of flight, and a nose at an end opposite the tail section;
a deep stall inducing section that selectively causes the wings and the tail section to cooperate and cause the UAV to perform a deep stall maneuver; and
an airframe near the nose, the airframe having an inflatable sleeve on which the UAV lands when the sleeve is inflated, the sleeve being inflated after the deep stall maneuver has been completed, the inflatable sleeve being disposed about the longitudinal axis of the airframe and extending a specified distance beyond the front end of the airframe and essentially in the forward direction, the specified distance being sufficiently far from the front end of the airframe that the sleeve prevents the airframe from contacting a landing surface when the inflated sleeve attenuates an impact of landing,
wherein the UAV lands with substantially only vertical velocity.

4. An unmanned aerial vehicle (UAV) that lands after a deep stall maneuver with substantially no forward velocity, comprising:
an airframe having a longitudinal axis and a payload at a nose thereof, the nose being a forwardmost end of the airframe relative to a forward direction of flight;
a deep stall inducing section that causes the UAV to execute a deep stall maneuver; and
an inflatable sleeve on which the UAV lands, the inflatable sleeve being disposed about the longitudinal axis of the airframe, extending beyond the nose and in the forward direction, and extending a distance sufficiently far from the nose so as to prevent the nose or the payload from contacting a landing surface when the UAV lands.

5. An unmanned aerial vehicle (UAV), comprising:
a support member extending a length of the UAV to which wings and a tail section are connected;
an airframe connected to an underside of the support member at a forwardmost end of the UAV relative to a forward direction of flight;
a deep stall inducing section that causes the UAV to perform a deep stall maneuver; and
an inflatable sleeve on which the UAV lands when the sleeve is inflated after a deep stall maneuver is completed, the inflatable sleeve being aligned with a longitudinal axis of the airframe, extending beyond the forwardmost end of the airframe and by a distance sufficient to prevent the airframe from contacting a landing surface when the UAV lands,
wherein the UAV lands substantially without horizontal velocity.

* * * * *